United States Patent [19]
Xia et al.

[11] Patent Number: 5,552,786
[45] Date of Patent: Sep. 3, 1996

[54] METHOD AND APPARATUS FOR LOGGING UNDERGROUND FORMATIONS USING RADAR

[75] Inventors: Jiqing Xia, Ridgefield; Tarek M. Habashy, Danbury; David R. Mariani, deceased, late of Darien, by Nancy M. Falls, executrix; Richard W. Gaylor, Brookfield, all of Conn.

[73] Assignee: Schlumberger Technology Corporation, New York, N.Y.

[21] Appl. No.: 353,462

[22] Filed: Dec. 9, 1994

[51] Int. Cl.$^6$ .......................... G01S 13/86; G01S 13/06; G01S 7/28

[52] U.S. Cl. ...................... 342/22; 367/82; 367/35

[58] Field of Search .................... 342/22, 27, 125, 342/126; 367/82, 35

[56] References Cited

U.S. PATENT DOCUMENTS

| | | | |
|---|---|---|---|
| 4,161,731 | 7/1979 | Barr | 343/14 |
| 4,218,678 | 8/1980 | Fowler et al. | 343/5 FT |
| 4,297,699 | 10/1981 | Fowler et al. | 343/5 NA |
| 4,430,653 | 2/1984 | Coon et al. | 343/5 NA |
| 4,524,435 | 6/1985 | Helbig et al. | 367/41 |
| 4,670,717 | 6/1987 | Sender | 324/338 |
| 4,689,569 | 8/1987 | Duff | 324/338 |
| 4,814,768 | 3/1989 | Chang | 342/22 |
| 4,866,680 | 9/1989 | Scherbatskoy | 367/83 |
| 4,953,147 | 8/1990 | Cobb | 367/35 |
| 5,012,453 | 4/1991 | Katz | 367/57 |
| 5,113,379 | 5/1992 | Scherbatskoy | 367/83 |

*Primary Examiner*—John B. Sotomayor
*Attorney, Agent, or Firm*—Martin D. Hyden; Leonard W. Pojunas

[57] ABSTRACT

A method of logging an underground formation from within a borehole includes the steps of emitting an electromagnetic signal from a first location in a borehole, determining a time at which the signal is emitted, detecting a direct component of the signal which has passed from the first location to a second location without being reflected, determining a time at which the direct component arrives at the second location and determining the speed of the signal in the underground formation from the time at which the signal is emitted, the time of arrival of the direct component and the spacing of the first and second locations. The speed of the signal can be used for radar logging of the formation. A logging tool for performing the method includes a transmitter at a first position in a tool body for emitting an electromagnetic signal, means located in the tool body for determining a time at which the signal is emitted, a receiver at a second position in the tool body for detecting a signal which has passed from the transmitter to the receiver through an underground formation; and means located in the tool body for processing the detected signal using the time at which a corresponding signal is emitted from the transmitter.

20 Claims, 5 Drawing Sheets

5,552,786

METHOD AND APPARATUS FOR LOGGING UNDERGROUND FORMATIONS USING RADAR

FIELD OF THE INVENTION

The present invention relates to a method and apparatus for logging underground formations using radar in which the speed of the electromagnetic wave in the underground formation is determined from the radar measurement. The present invention also provides a method and apparatus for determining the formation wave speed of an electromagnetic signal.

BACKGROUND OF THE INVENTION

In oil exploration and geophysical survey, it is useful to provide measuring systems which can detect locations of boundaries between different formations. Examples of applications of such systems include reservoir characterization, geo-steering in horizontal drilling, salt dome mapping for engineering of gas storage caverns and delineation of hydrocarbon traps, waste disposal control, and rock fracture detection in environmental logging. There are several advantages of using transient electromagnetic (radar) signals in such measurements. First, the arrival time of reflected signals is a direct measure of boundary locations, if the wave speed of the background medium is known. Second, the pulse can have a narrow temporal width which gives high spatial resolution.

Generally, radar measurements comprise transmitting an electromagnetic signal from a transmitter which is reflected from a target structure of interest and the reflected signal is detected at a receiver. In general terms, for a radar system to be able to determine the distance to the structure, the space between the transmitter and receiver must be known together with the speed of the signal through the medium separating the transmitter/receiver and the target structure. In cases where the signal passes through air, the wave speed is known and does not vary significantly with conditions. However, measurement of the wave speed in underground formations has been difficult and can vary significantly. Borehole logging tools utilizing the principle of radar have been proposed in U.S. Pat. No. 4,670,717, U.S. Pat. No. 4,814,768, U.S. Pat. No. 4,297,699, U.S. Pat. No. 4,430,653 and GB 2,030,414. Some of the previously proposed techniques assume values for the wave speed to allow interpretation of the radar signal. For example, in U.S. Pat. No. 4,814,768 the wave speed is assumed to be the speed of an electromagnetic wave in water. Other techniques rely on separate measurements to provide the wave speed. These approaches suffer from certain problems. Where a value is assumed, the actual speed can vary significantly from formation to formation relative to this value making interpretation of the signals inaccurate. Where the speed is obtained from other measurements, the operation takes longer and is more expensive.

It is an object of the present invention to provide a method and apparatus which overcomes or avoids the above identified problems. The present invention allows the formation wave speed to be obtained from the measurements made by a borehole radar tool.

The present invention achieves this object by measuring the arrival of a direct signal from a transmitter to a receiver to obtain the formation wave speed. It is a further object of the invention to provide a tool in which the time of arrival of the direct signal can be measured.

SUMMARY OF INVENTION

The method according to the invention includes the steps of: a) emitting an electromagnetic signal from a transmitter in a borehole; b) detecting the time of arrival of a direct signal from the transmitter to a receiver spaced therefrom; and c) from the time for the direct signal to arrive and a knowledge of the separation of the transmitter and receiver, determining the speed of the signal through the formation adjacent the borehole. Consequently, the time of emission of the signal must be known or determined.

Preferably, the method includes detecting signals reflected from structures within the formation and determining the time taken from emission to detection of these signals. This time, together with the wave speed can be used to determine the distance of the reflecting structures from the borehole.

Apparatus according to the present invention comprises a tool incorporating a transmitter and receiver spaced apart, means for determining the time taken for a direct signal to be transmitted from the transmitter to the receiver through the formation adjacent the borehole and means for determining the speed of the signal through the formation. The apparatus also preferably includes means for detecting the time of arrival of signals reflected from structures in the formation and for determining the distance of such structures from the borehole.

The present invention resides in the discovery that the path of a direct signal from a transmitter to a receiver in a borehole radar tool is predominantly in the formation immediately adjacent the borehole and that the wave speed in this formation has the dominant effect on the time for the signal to pass to the detector. It has been found that the signal does not pass along the tool or through the borehole itself but passes directly from the transmitter to the borehole wall, then through the formation to the level of the receiver and back to the receiver on the tool. The distance along the borehole, i.e. between the transmitter and receiver is relatively large compared to the distance from the tool to the borehole wall and the speed of the signal through the borehole fluid is not significantly slow so as to affect the overall speed of the signal between the transmitter and receiver.

This approach has the advantage that all of the necessary measurements can be made with one tool in a single operation and is able to account for environmental effects on the wave speed in the formation where measurements are to be made.

DETAILED DESCRIPTION OF PREFERRED EMBODIMENT

The borehole logging tool of the type to which the present invention is particularly applicable is described in U.S. Pat.

No. 4,670,717 (incorporated herein by reference). The present invention resides in the realization that the direct signal from the transmitter to the receiver travels predominantly through the formation adjacent the borehole and so the time for the direct signal is essentially due to the wave speed in the formation.

Figure 1:
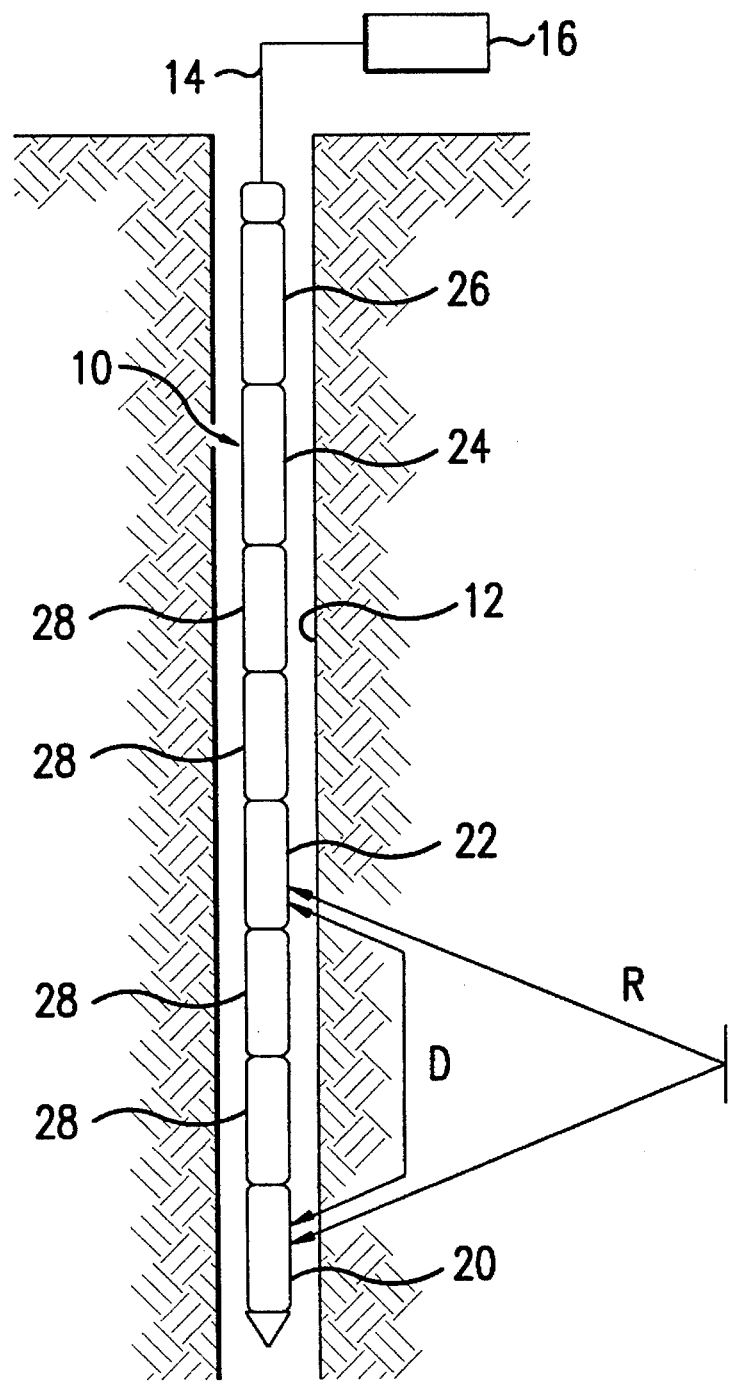
FIG. 1 shows a borehole radar logging tool.

Referring now to FIG. 1, there is shown therein a borehole logging tool generally indicated by reference numeral 10 suspended in a borehole 12 by means of a cable 14 which is lead back to the surface and connects to a data acquisition and processing system 16 in a manner conventional in borehole formation logging. The tool 10 comprises a transmitter section 20, a receiver section 22, a receiver and digitization electronics package 24 and a power supply and compass section 26. The transmitter section 20, the receiver section 22 and the receiver and digitization electronics package are separated by fiberglass spacer sections 28. The transmitter section 20 includes a self-triggering, battery powered pulser arranged such that there is no metallic material between the transmitter and receiving antennas in the receiver section 22.

Figure 2:
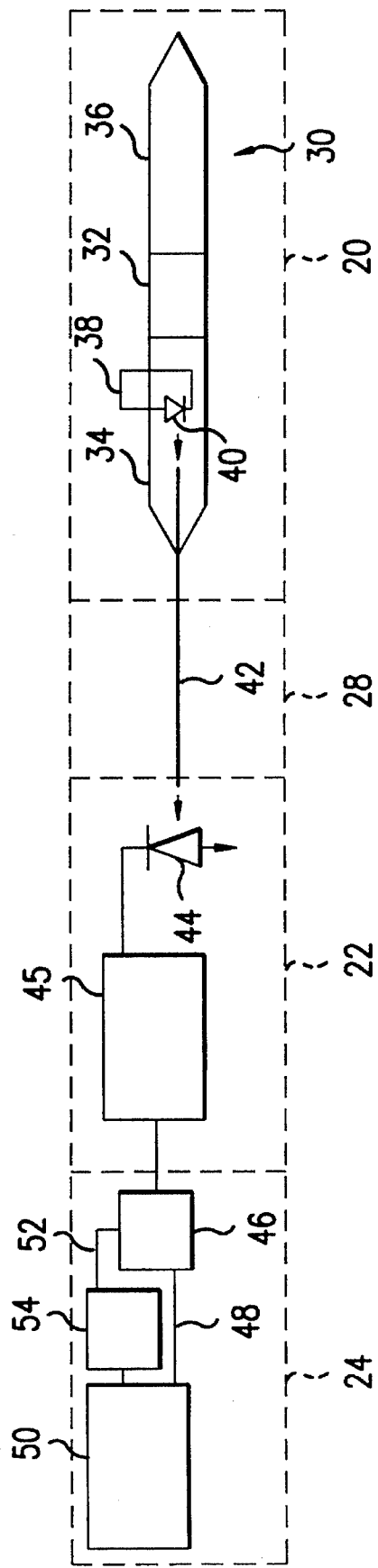
FIG. 2 shows a first embodiment of a system according to the invention.
Figure 3:
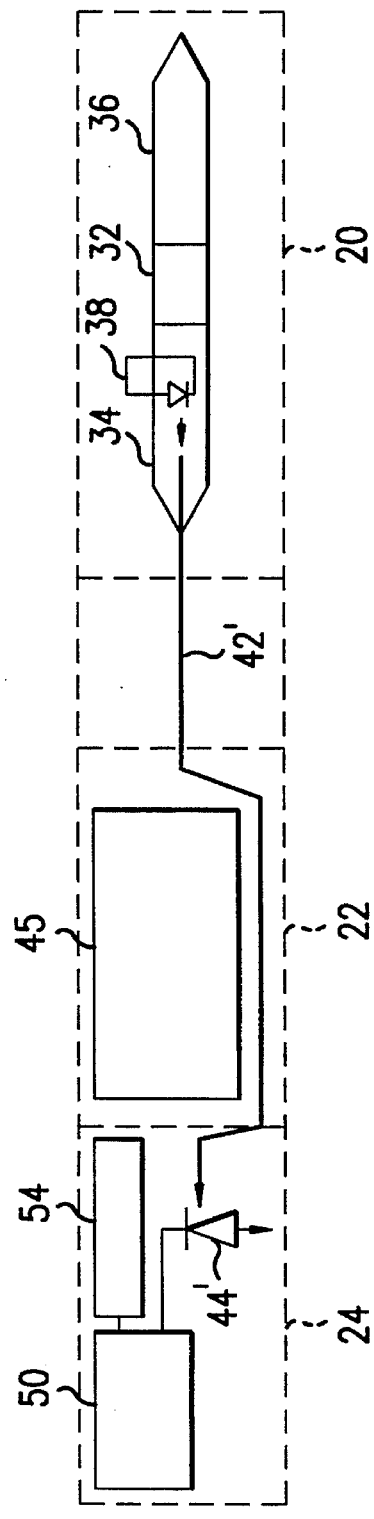
FIG. 3 shows a second embodiment of a system according to the invention.
Figure 4A:
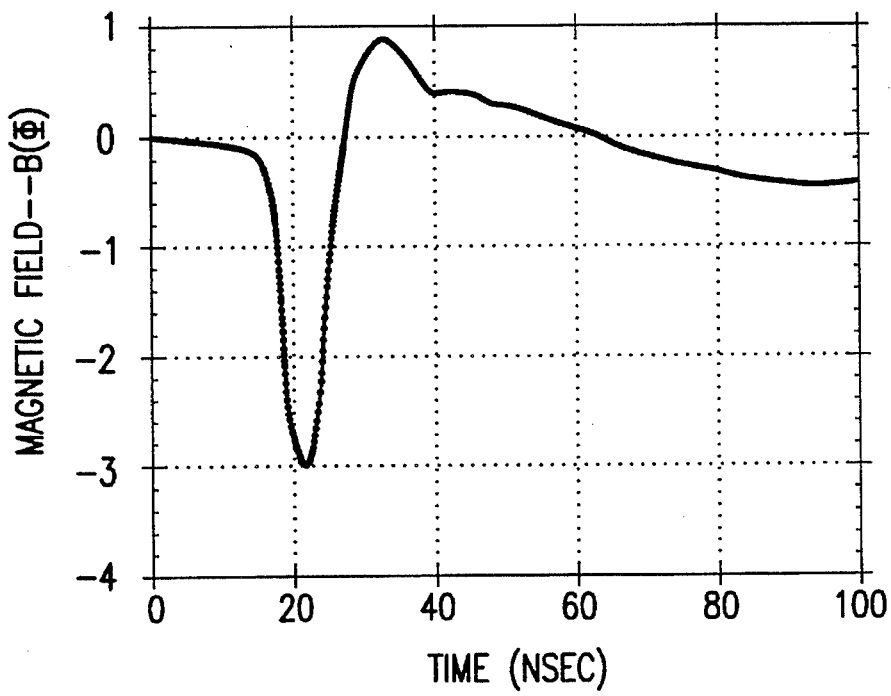
FIGS. 4(a) and (b) show the transmitter signal in the time and frequency domains.
Figure 4B:
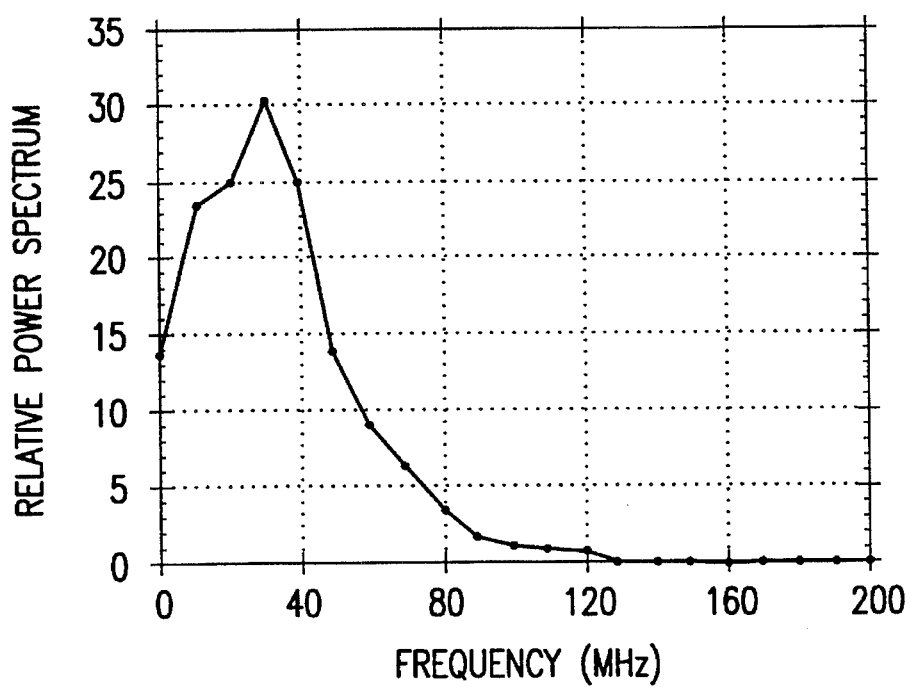

FIGS. 2 and 3 show different embodiments of a system according to the present invention. The parts of the tool shown in FIG. 1 are shown in dashed line. The system shown in FIG. 2 comprises a transmitter 30 comprising a battery-powered, self triggering pulser 32 positioned in the gap between the feed points to the antenna dipoles 34, 36. A small metal pick-up loop 38 is positioned adjacent the antenna and an infrared LED 40 is connected to the terminals of the loop 38. Sufficient power is coupled to the loop 38 from the antenna to drive the LED 40 without amplification but in certain circumstances application of a d.c. bias or amplification may be appropriate. The infrared output from the LED 40 is coupled to a non-metallic, fiber optic cable 42 which passes from the transmitter section 20 through the spacer 28 to the receiver section 22. The fiber optic cable 42 couples to a photodiode 44 in the receiver section 22 which acts to cause a signal to be detected in the receiving antenna 45 located therein. The receiving antenna 45 comprises crossed loop dipoles responsive to transient electromagnetic signals of MHz frequencies. The signal produced by the antenna passes to a power splitter 46 in the receiver and electronics package 24. One feed 48 from the splitter 46 passes directly to a digitizer 50 so as to trigger digitization of incoming signals. The other feed 52 passes to the digitizer 50 via a delay line 54 such that the digitizer is triggered by the time the delayed signal is received. This approach to triggering the digitizer has the advantage that the triggering signal is itself digitized which allows convenient processing of the signal. FIGS. 4a and 4b show respectively the pulse shape in the time domain and the power spectrum in the frequency domain of the transmitter 30.

A similar alternative system is shown in FIG. 3 in which corresponding numbers are used for the parts shown in FIG. 2. In the case of the FIG. 3 embodiment, the optical fiber cable 42' passes from the transmitter section 20 to the photodiode 44' in the receiver and electronics package 24. In this case, the output from the photodiode 44' is used to trigger the digitizer 50 directly, the delay induced by the delay line being such as to ensure that a signal can pass from the transmitter 30 to the digitizer 50 before a signal from the receiving antenna 42 is received at the digitizer 50. This approach avoids broadening of the trigger signal by passage through the time response characteristic of the receiver and antenna.

In both cases the output from the digitizer 50 is passed to the surface via the cable 14 in a conventional manner.

For the purposes of the invention, the borehole can be considered as a cylindrical waveguide. The transmitter and receiver antennas of the borehole radar tool described above in relation to FIGS. 2 and 3 excite fields which are transverse-magnetic (TM) with respect to the borehole axis. The lowest order mode in the borehole is the $TM_{01}$ mode. For the case of a gneiss formation with dielectric constant 7.46 and a borehole of radius 3.3 inch filled with fresh water of a dielectric constant 78, the cutoff frequency for the $TM_{01}$ mode is 163.1 MHz. For the tool described above, the pulse has a center frequency around 40 MHz and the highest frequency component in the pulse's spectrum is at about 120 MHz. Thus, even for this high dielectric borehole fluid, all borehole modes are below cutoff and hence there are no guided waves that propagate inside the borehole. Furthermore, the wavelength of the pulse (at its central frequency) in the borehole water is about 33" which is much longer than the most typical borehole diameters. The wavelength in the rock formation is about 9 feet.

Thus, the borehole and the fluid contained therein behave as a mere thin coating to the antennas resulting in a leakage of the transmitted energy out of the confinement of the borehole. Therefore, the direct arrival signal travels through the formation near the borehole with a speed determined by the electrical parameters of the formation. Knowing the transmitter-receiver spacing allows one to compute the formation wave speed as the ratio of the antenna spacing to the time delay of the direct arrival signal. Using the system described above, the speed of the signal in the fiber optic cable 42/42' can be calculated and so the time at which the transmitter pulsed can be determined. In the embodiment of FIG. 2, the first pulse in the delayed receiver signal at the digitizer 50 will be the signal from the fiber optic cable, followed by the direct transmission signal component from transmitter to receiver through the formation adjacent the borehole (path D in FIG. 1) and then by a series of reflection signal components from deeper within the formation (path R in FIG. 1). In the embodiment of FIG. 3, there will be no fiber optic signal in the digitized signal itself, but the time at which the digitizer 50 is triggered to start recording can be calculated and hence the elapsed time for the signal components D and R to arrive after transmitter pulsing determined.

Figure 5A:
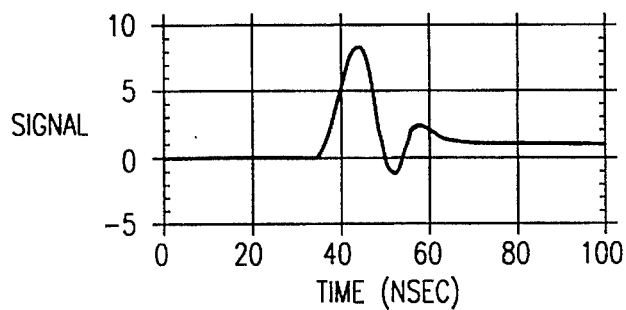
FIGS. 5(a)–(e) show plots of the direct signal component arrival for different media.
Figure 5B:
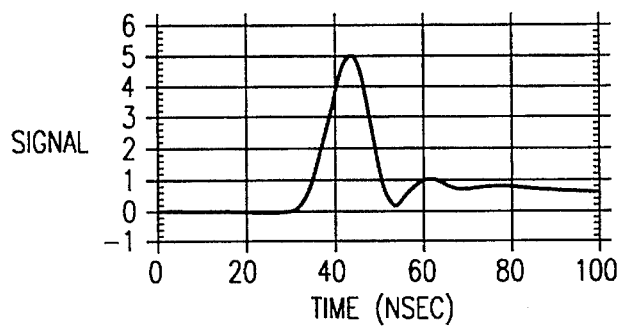
Figure 5C:
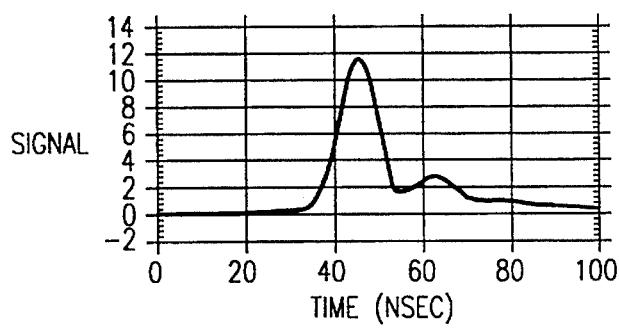
Figure 5D:
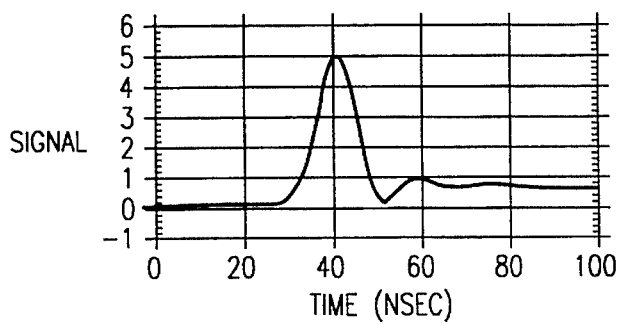
Figure 5E:
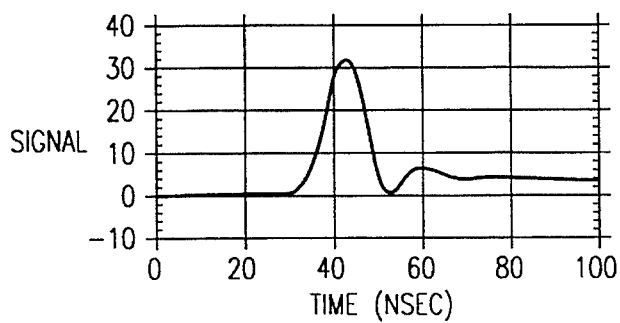

FIGS. 5(a)–(e) show a simulated responses of the direct signal component D arrival (i.e. no reflection) of the radar tool. To model the response of the tool, an antenna separation h=14.8 ft and a fresh-water filled, 6.6 inch diameter borehole drilled in a gneiss formation (dielectric of 7.5 and conductivity of 0.4 mS/m) are chosen. The spectral content of the excitation current on the transmitter was centered at about 40 MHz. The direct arrival for this case is shown in FIG. 5(a). FIGS. 5(b)–(d) represent the same conditions except that the borehole fluid has been changed to oil-base mud, water-base mud and air respectively. FIG. 5(e) shows the direct arrival signature in an unbounded gneiss (i.e., no borehole). Note that the direct arrival at time t~42 nsec is almost unaffected by the presence of the borehole or by the fluid type it contains. There is, however, a clear influence on the signal amplitude. By contrast, a pulse propagating in air would arrive at a time t~15 nsec.

It can be demonstrated that for a properly designed radar tool (i.e., no parasitic couplings and h>>d, where h is the separation between the transmitter and receiver and d is the diameter of the borehole), the time of the first arrival is almost independent of borehole fluid type and borehole size and is given approximately by $t=h/v_f$ where $v_f$ is the wave speed in the formation. Thus, a borehole radar tool can be configured to provide a continuous log of electromagnetic wave speed in the formation near the wellbore. This provides a self-contained way to calibrate radar maps by translating reflection arrival times into absolute distances.

Figure 6:
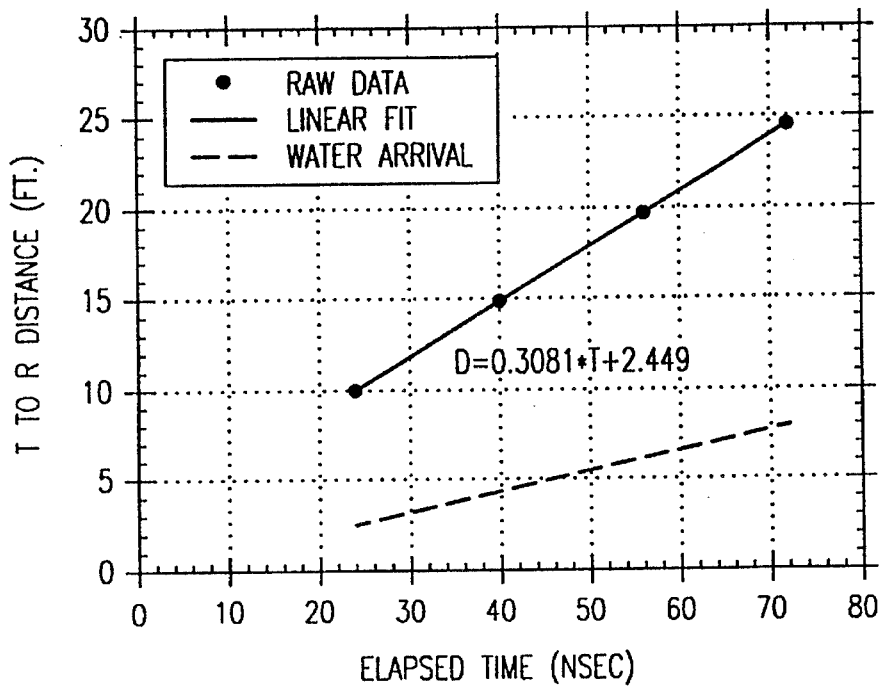
FIG. 6 shows a plot of the direct signal component arrival time for different transmitter/receiver spacings.
Figure 7:
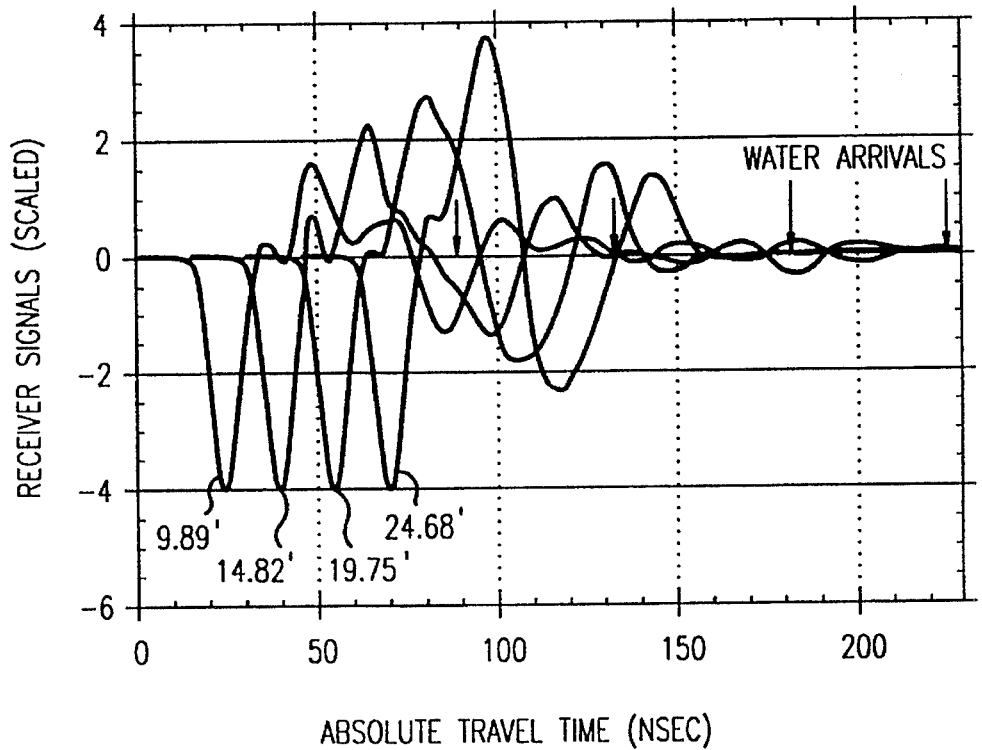
FIG. 7 shows a plot of transmitter/receiver spacing against arrival time.

A tool corresponding to the embodiment of FIG. 3 was deployed in a 12.25" diameter, water-filled (resistivity=30 ohm–m), 42.5' deep borehole drilled in a metamorphic rock formation (gneiss) to test the invention. The well was lined with plastic (PVC) casing. The pick-up loop 38 in the transmitter section is replaced by a small, magnetic loop antenna, placed in the borehole at the depth of the transmitter, provided a trigger pulse which was referenced to the firing of the free-running transmitter. A long, fiber-optic link coupled the trigger signal from the pick-up loop to the triggering input of a digitizing scope used to measure the signals from the receiving antenna. Measurements were made at four, discrete transmitter-receiver spacings: 9.89', 14.82', 19.75' and 24.68'. FIG. 6 plots the received time-domain waveforms as a function of elapsed time from the firing of the transmitter. The trace amplitudes have been scaled to facilitate comparisons of the direct arrival signals. The direct arrival signals are sharply defined and the time progression as the transmitter-receiver spacing is increased in equal increments is substantially uniform. The arrows in the figure mark the arrival times (for each of the four antenna spacings) one would anticipate for wave propagation through a homogeneous body of the borehole water. It is clear that 1) there is no significant signal propagating through the borehole water and 2) the direct arrivals are propagating at a velocity which is almost three times faster than the wavespeed in water. This is amplified in FIG. 7 in which the times of the direct arrival signals are plotted with the antenna spacings. The slope of this almost-perfect line provides a wavespeed of about 0.31 ft/nsec. This is very consistent with reference wavespeed values for the type of metamorphic rock found in the test area. For comparison, the dashed line in the figure indicates hypothetical arrival times for wave propagation through the water in the borehole.

In implementing the above proposed idea in a borehole tool, one needs to accurately measure the delay time of the direct arrival. In the embodiments described above, this is done by sending a reference pulse from the transmitter to the receiving electronics each time the transmitter sends out its pulse to the formation. In the tool of FIG. 1, there is no metallic connection between the transmitter and the receiver in order to remove the possibility of a transmission path through the tool itself, the transmitter being self-contained. The reference pulse is propagated through a known, non-metallic medium such as an optical fiber so that the direct arrival is not perturbed. In the case where the transmitter pulses in response to control signals, those control signals can be used to provide the pulse time from which the time for the direct arrival signal component can be determined. The manner in which the time of the transmitter pulse is obtained is not critical to the broad scope of this invention.

We claim:

1. A method of determining the speed of an electromagnetic signal in an underground formation from within a borehole, comprising the steps of:

a) emitting an electromagnetic signal into the formation from a first location in a borehole;

b) determining a time at which the signal is emitted;

c) at a second location spaced a known distance from the first location in the borehole, detecting a first component of the signal which has passed directly from the first location to the second location via the formation without being reflected;

d) determining a time at which the first component arrives at the second location; and e) determining the speed of the signal in the underground formation from the time at which the signal is emitted, the time of arrival of the first component and the spacing of the first and second locations.

2. A method as claimed in claim 1, wherein the step of determining the time at which the signal is emitted comprises detecting the signal at the first location.

3. A method as claimed in claim 2, wherein detection of the emitted signal is used to generate a marker signal at the second location.

4. A method as claimed in claim 2, wherein the detection of the emitted signal is used to initiate detection of the first signal component at the second location.

5. A method of logging an underground formation from within a borehole, comprising the steps of:

a) emitting an electromagnetic signal into the formation from a first location in a borehole;

b) determining a time at which the signal is emitted;

c) at a second location spaced a known distance from the first location in the borehole, detecting a first component of the signal which has passed directly from the first location to the second location via the formation without being reflected;

d) determining a time at which the first component arrives at the second location;

e) determining the speed of the signal in the underground formation from the time at which the signal is emitted, the time of arrival of the first component and the spacing of the first and second locations; and f) using the speed of the signal for logging the formation.

6. A method as claimed in claim 5, further comprising:

g) at the second location, detecting a second component of the signal which has passed from the first location to the second location via a reflecting structure in the underground formation;

h) determining a time at which the second component arrives at the second location; and i) using the speed of the signal and the time of arrival of the second component for logging the formation.

7. A method as claimed in claim 6, wherein the speed of the signal and the time of arrival of the second component are used to determine the location of the reflecting structure.

8. A method as claimed in claim 5, wherein the step of determining the time at which the signal is emitted comprises detecting the signal at the first location.

9. A method as claimed in claim 8, wherein detection of the emitted signal is used to generate a marker signal at the second location.

10. A method as claimed in claim 8, wherein the detection of the emitted signal is used to initiate detection of the first signal component at the second location.

11. Apparatus for logging an underground formation from within a borehole, comprising:

a) a transmitter at a first location in a borehole for emitting an electromagnetic signal into the formation:

b) means for determining a time at which the signal is emitted;

c) a receiver at a second location in the borehole for detecting a signal which has passed from the transmitter to the receiver through the formation without being reflected; and d) means for processing the detected signal using the time at which a corresponding signal is emitted from the transmitter.

12. Apparatus as claimed in claim 11, wherein the means for determining the time at which the signal is emitted is connected to the receiver so as to generate a signal therein when a signal is emitted.

13. Apparatus as claimed in claim 11, wherein the means for determining the time at which the signal is emitted is connected to the means for processing the detected signal.

14. Apparatus as claimed in claim 11, wherein the transmitter comprises a dipole antenna.

15. Apparatus as claimed in claim 14, wherein the means for determining the time at which the signal is emitted comprises a pick-up loop adjacent the antenna.

16. Apparatus as claimed in claim 15, wherein an LED is connected to the pick-up loop so as to generate a light signal when a signal is emitted.

17. Apparatus as claimed in claim 16, wherein the LED is connected to the receiver by means of a fiber optic cable.

18. Apparatus as claimed in claim 16, wherein the LED is connected to the means for processing the detected signal by means of a fiber optic cable.

19. A borehole logging tool, comprising:

a) a tool body;

b) a transmitter at a first position in the tool body for emitting electromagnetic signals into the formation;

c) means located in the tool body for determining a time at which the signals are emitted;

d) a receiver at a second position in the tool body for detecting signals which have passed from the transmitter to the receiver through an underground formation without being reflected and signals which have passed from the transmitter to the reciever through the formaiton and have been reflected; and e) means located in the tool body for processing the detected the time at which corresponding signals are emitted from the transmitter.

20. A borehole logging tool as claimed in claim 19, wherein the transmitter comprises a dipole antenna and the means located in the tool body for determining a time at which the signal is emitted comprises a pick-up loop adjacent the antenna, an LED being connected to the pick-up loop such that a light signal is generated when a signal is emitted which is passed to a photodiode at the receiver by means of a fiber optic cable so as to generate a signal at the receiver when a signal is emitted.

* * * * *